United States Patent
Kinoshita et al.

(10) Patent No.: US 10,679,077 B2
(45) Date of Patent: Jun. 9, 2020

(54) ROAD MARKING RECOGNITION DEVICE

(71) Applicants: TOYOTA JIDOSHA KABUSHIKI KAISHA, Toyota-shi, Aichi-ken (JP); THE UNIVERSITY OF TOKYO, Bunkyo-ku, Tokyo (JP); National University Corporation Tokyo University of Agriculture and Technology, Fuchu-shi, Tokyo (JP)

(72) Inventors: Toshiki Kinoshita, Susono (JP); Takuma Ito, Tokyo (JP); Satoshi Nakamura, Tokyo (JP); Minoru Kamata, Tokyo (JP); Pongsathorn Raksincharoensak, Fuchu (JP); Tsukasa Shimizu, Nagakute (JP)

(73) Assignees: TOYOTA JIDOSHA KABUSHIKI KAISHA, Toyota-shi, Aichi-ken (JP); THE UNIVERSITY OF TOKYO, Bunkyo-ku, Tokyo (JP); National University Corporation Tokyo University of Agriculture and Technology, Fuchu-shi, Tokyo (JP)

( * ) Notice: Subject to any disclaimer, the term of this patent is extended or adjusted under 35 U.S.C. 154(b) by 0 days.

(21) Appl. No.: 15/784,457

(22) Filed: Oct. 16, 2017

(65) Prior Publication Data
US 2018/0107884 A1    Apr. 19, 2018

(30) Foreign Application Priority Data
Oct. 17, 2016    (JP) ................................. 2016-203848

(51) Int. Cl.
G06K 9/00    (2006.01)
G06K 9/62    (2006.01)
(Continued)

(52) U.S. Cl.
CPC ..... *G06K 9/00818* (2013.01); *G06K 9/00798* (2013.01); *G06K 9/4609* (2013.01);
(Continued)

(58) Field of Classification Search
None
See application file for complete search history.

(56) References Cited

U.S. PATENT DOCUMENTS 10,452,075 B2 * 10/2019 Jang .................. B60W 10/22
10,522,038 B2 * 12/2019 Bielby ................ G08G 1/052
(Continued)

FOREIGN PATENT DOCUMENTS

JP    2001236501 A    8/2001
JP    2009-139306 A    6/2009
(Continued)

OTHER PUBLICATIONS

Ninagawa Y, JP 2002-166991 "Image recognition device used for vehicle, has judgment unit which recognizes any one of several patterns, based on position relationship of area of compared template" English machine translation ; Aug. 31, 2001 (Year: 2001).*

*Primary Examiner* — Nancy Bitar
(74) *Attorney, Agent, or Firm* — Sughrue Mion, PLLC (57) ABSTRACT

A road marking recognition device recognizes a road marking from an image acquired by imaging a road surface of a road on which a vehicle is traveling. The road marking recognition device includes: a storage unit configured to store a plurality of templates each of which corresponds to a corresponding one of plurality of feature portions of a road marking as a recognition target and between which a relative positional relationship is known; and a recognition unit configured to detect a second feature portion corresponding to a second template among the plurality of templates when the first feature portion is detected from the image.

7 Claims, 7 Drawing Sheets

(51) Int. Cl.
*G06K 9/46* (2006.01)
*G08G 1/0962* (2006.01)
(52) U.S. Cl.
CPC ....... *G06K 9/6271* (2013.01); *G08G 1/09623* (2013.01); *G06T 2207/30256* (2013.01)

(56) References Cited

U.S. PATENT DOCUMENTS

| | | | | |
|---|---|---|---|---|
| 2008/0161987 | A1* | 7/2008 | Breed | G08G 1/161 |
| | | | | 701/27 |
| 2008/0273757 | A1* | 11/2008 | Nakamura | G01C 21/26 |
| | | | | 382/104 |
| 2010/0259609 | A1* | 10/2010 | Takahashi | G06K 9/72 |
| | | | | 348/135 |
| 2011/0044543 | A1* | 2/2011 | Nakamura | G06K 9/00798 |
| | | | | 382/190 |
| 2012/0093361 | A1* | 4/2012 | Huang | G06T 7/277 |
| | | | | 382/103 |
| 2015/0161454 | A1* | 6/2015 | Han | G06K 9/00798 |
| | | | | 382/104 |
| 2016/0305794 | A1* | 10/2016 | Horita | G01C 21/3602 |
| 2016/0334796 | A1* | 11/2016 | Inoue | G05D 1/0278 |
| 2019/0113332 | A1* | 4/2019 | Nishimura | H04N 5/23254 |

FOREIGN PATENT DOCUMENTS

| | | |
|---|---|---|
| JP | 2010-108049 A | 5/2010 |
| JP | 2016-215733 A | 12/2016 |

\* cited by examiner

FIG. 3B dia_1  dia_2  dia_3  dia_4

FIG. 4A

SEARCH RANGE OF GROUP C

SEARCH RANGE OF GROUP B

DETECTION OF GROUP A

FIG. 4B

PRESENCE ALLOWABLE RANGE OF 40_2

WIDTH OF 40_1 w2   w1

ROAD MARKING RECOGNITION DEVICE

INCORPORATION BY REFERENCE

The disclosure of Japanese Patent Application No. 2016-203848 filed on Oct. 17, 2016 including the specification, drawings and abstract is incorporated herein by reference in its entirety.

BACKGROUND

1. Technical Field

The disclosure relates to a road marking recognition device.

2. Description of Related Art

As such a type of device, for example, a device that detects a plurality of feature portions of a road marking from an image acquired by imaging a road surface, determines that a road marking has been recognized as a detection target when detection confidence levels of the feature portions are higher than a threshold value, changes detection conditions for the feature portions of which the detection confidence level is lower than the threshold value, and performs re-detection has been proposed (see Japanese Patent Application Publication No. 2010-108049 (JP 2010-108049 A)). A device that changes determination conditions relevant to road marking recognition such as the number of features to be detected depending on whether there is a road marking having a shape similar to a road marking that is a recognition target around a vehicle has also been proposed (see Japanese Patent Application Publication No. 2009-139306 (JP 2009-139306 A)).

SUMMARY

In the above-mentioned related art, when a vehicle travels at a relatively high speed, there is a likelihood that a computational load relevant to a process of recognizing a road marking will increase, for example, due to detection of a plurality of feature portions or re-detection.

The disclosure provides a road marking recognition device that can improve recognition accuracy while minimizing a computational load.

A first aspect of the disclosure provides a road marking recognition device that recognizes a road marking from an image acquired by imaging a road surface of a road on which a vehicle is traveling. The road marking recognition device according to the first aspect includes: a storage unit configured to store a plurality of templates each of which corresponds to corresponding one of a plurality of feature portions of a target road marking and between which a relative positional relationship is known, the target road marking being a road marking which is a recognition target; and a recognition unit configured to detect a second feature portion corresponding to a second template among the plurality of the templates when a first feature portion corresponding to a first template among the plurality of templates is detected from the image, the second template being located on a front side of the first feature portion in traveling direction.

In the road marking recognition device, when a feature portion among a plurality of feature portions of a road marking that is a recognition target is detected from an image acquired by imaging a road surface (that is, when a feature portion corresponding to the first template is detected), another feature portion (that is, a feature portion corresponding to the second template) of which the relative positional relationship with the detected feature portion is known is detected. That is, the road marking recognition device does not recognize a whole road marking at once, but detects a portion corresponding to a part of a road marking that is a recognition target and detects a portion corresponding to another part of the road marking that is the recognition target when the portion is detected from an image obtained by imaging a road surface. Accordingly, according to the road marking recognition device, it is possible to reduce a computational load related to a recognition process in comparison with a case in which a whole road marking is recognized at once.

In addition, when there is disturbance such as when a part of a road marking is worn or when a shadow of a building or the like is suspended over a part of a road marking, the road marking recognition device pays attention to a partial (local) feature portion and thus can perform a recognition process with little to no influence from the disturbance. Accordingly, according to the road marking recognition device, it is possible to improve accuracy of the recognition process in comparison with a case in which the whole road marking is recognized at once.

In the first aspect, the recognition unit may be configured to determine that the target road marking is recognized when the second feature portion is detected.

The road marking recognition device according to the first aspect detects a road marking that is a recognition target using templates between which a relative positional relationship is known. Accordingly, the relative positional relationship between the detected feature portions corresponding to the first and second templates is the same as the relative positional relationship between the first and second templates. Accordingly, when two feature portions corresponding to the first and second templates are detected, there is a relatively high likelihood that the road marking that is the recognition target will be recognized. Accordingly, according to the above configuration, it is possible to relatively easily improve accuracy of a recognition process while minimizing a computational load.

A second aspect of the disclosure provides a road marking recognition device mounted in a vehicle including a camera configured to acquire an image by imaging a road surface of a road on which the vehicle is traveling. The road marking recognition device includes: a storage unit configured to store a plurality of templates and a relative positional relationship between the plurality of templates, each of the plurality of templates corresponds to corresponding one of a plurality of feature portions of a target road marking, the target road marking being a road marking which is a recognition target; and at least one electronic control unit configured to: detect a first feature portion corresponding to a first template among the plurality of templates from a first image captured by the camera, and detect a second feature portion corresponding to a second template among the plurality of templates when the first feature portion is detected from the image.

In the second aspect, the electronic control unit may be configured to determine that the target road marking is recognized when the second feature portion is detected.

In the second aspect, the electronic control unit may be configured to: detect a candidate portion which is a candidate for the second feature portion, the candidate portion being a portion having a feature matching the second template; and determine that the candidate portion is the second feature portion when a position of the candidate portion is located in an allowable range which is set using a relative position between the first template and the second template.

In the second aspect, the electronic control unit may be configured to detect the second feature portion from a second image captured after the first image is captured.

In the second aspect, the second template may be set to correspond to a portion located on a front side of the first feature portion in a traveling direction of the vehicle.

Operations and other advantages of the disclosure will be apparent from the following embodiment.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A road marking recognition device according to an embodiment of the disclosure will be described with reference to FIGS. 1 to 8. In the following embodiment, description will be made using a vehicle M in which the road marking recognition device according to the disclosure is mounted.

(Configuration of Vehicle)

Figure 1:
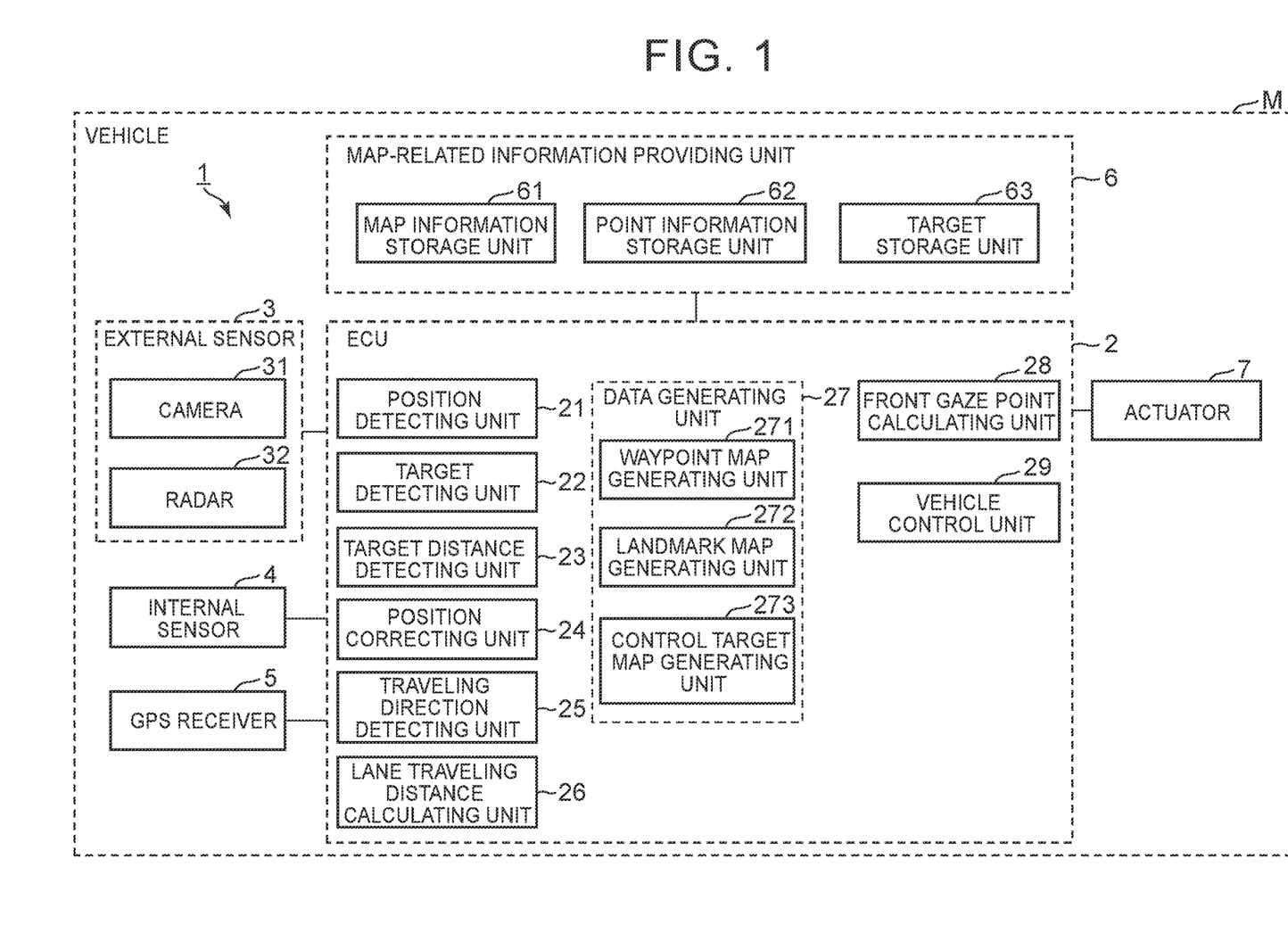
FIG. 1 is a block diagram illustrating a configuration of a vehicle according to an embodiment.

A configuration of a vehicle M will be described below with reference to FIG. 1. FIG. 1 is a block diagram illustrating a configuration of a vehicle according to an embodiment.

In FIG. 1, the vehicle M includes a vehicle controller 1. The vehicle controller 1 controls traveling of the vehicle M. Specifically, for example, the vehicle controller 1 controls the vehicle M such that the vehicle M travels by automatic driving along a route from a current position of the vehicle M to a destination based on map information.

The vehicle controller 1 includes an electronic control unit (ECU) 2, an external sensor 3, an internal sensor 4, a Global Positioning System (GPS) receiver 5, a map-related information providing unit 6, and an actuator 7.

The external sensor 3 includes a camera 31 and a radar 32. The camera 31 is disposed, for example, in the back of a front windshield of the vehicle M and on a rear surface of the vehicle M. The camera 31 transmits imaging information on the front side and the rear side of the vehicle M to the ECU 2. The camera 31 may be a monocular camera or a stereo camera. When the camera 31 is a stereo camera, parallax information (that is, distance information) may be included in the imaging information.

The radar 32 detects an obstacle (for example, another vehicle, a pedestrian, a bicycle, or a structure) outside the vehicle M using radio waves such as radio waves of 1 to 10 millimeters. The radar 32 transmits obstacle information indicating the detected obstacle to the ECU 2. Light detection and ranging (LIDAR) using light may be used instead of the radar 32.

The internal sensor 4 is a detector that detects a traveling state of the vehicle M. The internal sensor 4 includes, for example, a vehicle speed sensor, an acceleration sensor, and a yaw rate sensor. The internal sensor 4 transmits, for example, information indicating a vehicle speed, an acceleration, and a yaw rate to the ECU 2.

The GPS receiver 5 measures a position of the vehicle M (for example, latitude and longitude of the vehicle M) by receiving signals from three or more GPS satellites. The GPS receiver 5 transmits position information indicating the measured position of the vehicle M to the ECU 2.

The map-related information providing unit 6 is an information providing system which is mounted in the vehicle M. The map-related information providing unit 6 transmits, for example, data on map information, steering change points, and vehicle speed target points to the ECU 2 in response to a request from the ECU 2. Here, the steering change points and the vehicle speed target points are correlated with the map information. A steering change point refers to a point at which steering change of the vehicle M is set in a lane (for example, a curve or a crossing). A vehicle speed target point refers to a point at which a target vehicle speed of the vehicle M is set in a lane (for example, a point at which a stop line or a pedestrian crossing is disposed).

The map-related information providing unit 6 includes a map information storage unit 61, a point information storage unit 62, and a target storage unit 63 as a processing block which is logically realized or a processing circuit which is physically realized therein.

The map information storage unit 61 is a database that stores map information. The point information storage unit 62 is a database that stores a steering change point and a vehicle speed target point which are correlated with the map information.

The target storage unit 63 is a database that stores target information on landmark targets. Target information includes position information of landmark targets (for example, information of a lane traveling distance along a lane) and detection feature information of the landmark targets.

Detection feature information of a landmark target is information which is used to detect the landmark target using the camera 31 and the radar 32. The detection feature information includes, for example, shape information which is used for detection by the camera 31 and reflection characteristic information which is used for detection by the radar 32.

The map-related information providing unit 6 may have a function of performing radio communication with a computer of a facility such as an external information management center. In this case, the map-related information providing unit 6 can update the map information, the steering change points, and the vehicle speed target points by performing radio communication if necessary.

The actuator 7 is a device that controls traveling of the vehicle M. The actuator 7 includes, for example, a throttle actuator, a brake actuator, and a steering actuator.

(Outline of Automatic Driving by Vehicle Controller)

The outline of automatic driving of the vehicle M which is performed by the vehicle controller 1 having the above-mentioned configuration will be described below.

The vehicle controller 1 generates lane traveling map data which is used for traveling of the vehicle M based on the map information, the steering change points, and the vehicle speed target points when a route on which the vehicle M should travel is set. A "route" includes roads (lanes) on which the vehicle M travels from a current position to a destination. The route may be set manually by a driver of the vehicle M or may be set automatically by the vehicle controller 1.

The lane traveling map data includes information of a target position, information of a target direction, and information of a target vehicle speed of the vehicle M traveling along the route. The lane traveling map data is generated for each lane. The lane traveling map data is generated based on a lane traveling distance which is a distance by which the vehicle M travels in the lane from a lane entrance position.

The lane traveling map data includes, for example, a waypoint map, a landmark map, and a control target map. The waypoint map is a data array relevant to a target position and a target direction of the vehicle M traveling along the route. Here, a point at which the target position and the target direction are correlated on the map information is referred to as a waypoint. The waypoint map is a data array in which a waypoint is set every predetermined distance based on the lane traveling distance for each lane.

The vehicle controller 1 dynamically generates a waypoint map using a route of the vehicle M, a current value of the vehicle M, and the steering change points during traveling of the vehicle M. The vehicle controller 1 generates a waypoint map on the assumption that parts other than the steering change points of lanes constituting the route have straight line shapes. That is, the waypoint map includes waypoints which are connected straightly along a lane in parts other than the steering change points.

The landmark map is a data array related to landmark targets which are used for position correction of the vehicle M. A landmark target is a detection target of which a position relative to a lane is fixed. Examples of a landmark target include road markings such as numerals or diamond marks which are drawn on a road surface. Examples of a landmark target also include structures by the roadside such as guard rails. For example, when a landmark target is detected by the camera 31, the vehicle controller 1 corrects the position of the vehicle M with reference to a position of the landmark target on the map information based on a distance between the landmark target and the vehicle M.

The control target map is a data array related to a target vehicle speed of the vehicle M traveling along a route. The control target map is, for example, a data array in which the vehicle speed target points for each lane are arranged depending on the lane traveling distance.

The vehicle controller 1 realizes traveling of the vehicle M along a route by controlling the vehicle M based on the generated lane traveling map data. Specifically, the vehicle controller 1 controls steering of the vehicle M based on the waypoint map and controls the vehicle speed of the vehicle M based on the waypoint map and the control target map.

(Configuration of ECU)

In the vehicle controller 1, the ECU 2 that comprehensively controls the vehicle controller 1 includes a position detecting unit 21, a target detecting unit 22, a target distance detecting unit 23, a position correcting unit 24, a traveling direction detecting unit 25, a lane traveling distance detecting unit 26, a data generating unit 27, a front gaze point calculating unit 28, and a vehicle control unit 29 as a processing block which is logically realized or a processing circuit which is physically realized therein in order to realize automatic driving of the vehicle M.

The position detecting unit 21 detects the position of the vehicle M. The position detecting unit 21 detects the position of the vehicle M in the lane using an existing method, for example, based on the position information of the vehicle M measured by the GPS receiver 5. The position detecting unit 21 may detect a lateral position of the vehicle M (that is, a position in the width direction of the lane) by recognizing a white line related to the lane in which the vehicle M travels based on the imaging information of the camera 31.

The target detecting unit 22 detects landmark targets in the front and back of the vehicle M from at least one of the imaging information of the camera 31 and the obstacle information of the radar 32 based on the detection result of the external sensor 3 and the target information of the map-related information providing unit 6, specifically, with reference to the target information of the target storage unit 63.

The target distance detecting unit 23 detects a distance between a landmark target and the vehicle M when the target detecting unit 22 detects the landmark target.

When the target distance detecting unit 23 detects the distance between the landmark target and the vehicle M, the position correcting unit 24 corrects the position information of the vehicle M detected by the position detecting unit 21 with respect to a position of the landmark target (which is expressed as a position in an xy coordinate system in this case) based on the distance between the landmark target and the vehicle M and the position of the landmark target in the map information. The position correcting unit 24 corrects the lane traveling distance calculated by the lane traveling distance detecting unit 26 with respect to the position of the landmark target (which is expressed by the lane traveling distance in this case) based on the distance between the landmark target and the vehicle M and the position of the landmark target in the map information.

The traveling direction detecting unit 25 detects a traveling direction of the vehicle M based on at least one of the yaw rate information of the internal sensor 4 and a temporal change of the position information of the vehicle M detected by the position detecting unit 21.

The lane traveling distance detecting unit 26 calculates a first lane traveling distance candidate which is a candidate for the lane traveling distance of the vehicle M in the traveling lane based on the position information of the vehicle M detected by the position detecting unit 21. The lane traveling distance detecting unit 26 calculates a second lane traveling distance candidate which is a candidate for the lane traveling distance based on the vehicle speed information of the internal sensor 4 from a lane entrance position of the traveling lane to a current value.

The lane traveling distance detecting unit 26 determines whether a difference between the first lane traveling distance candidate and the second lane traveling distance candidate is equal to or greater than a predetermined threshold value. When it is determined that the difference is not equal to or greater than the predetermined threshold value, the lane traveling distance detecting unit 26 sets the first lane traveling distance candidate as the lane traveling distance. On the other hand, when it is determined that the difference is equal to or greater than the predetermined threshold value, the lane traveling distance detecting unit 26 sets the second lane traveling distance candidate as the lane traveling distance.

The data generating unit 27 generates lane traveling map data. The data generating unit 27 includes a waypoint map generating unit 271, a landmark map generating unit 272, and a control target map generating unit 273 as a processing block which is logically realized or a processing circuit which is physically realized therein in order to generate the lane traveling map data.

The waypoint map generating unit 271 generates a waypoint map with reference to the steering change points of the point information storage unit 62 of the map-related information providing unit 6 based on the route of the vehicle M and the position (the current position) of the vehicle M. The landmark map generating unit 272 generates a landmark map for landmark targets with reference to the target information of the target storage unit 63 of the map-related information providing unit 6 based on the route of the vehicle M and the position (the current position) of the vehicle M. The control target map generating unit 273 generates a control target map with reference to the vehicle speed target points of the point information storage unit 62 based on the route of the vehicle M and the position (the current position) of the vehicle M.

The front gaze point calculating unit 28 calculates a front gaze point of the vehicle M based on the vehicle speed information of the internal sensor 4. A front gaze point is a point which is set in the front of the vehicle M and is a point corresponding to a point which is viewed by a driver when the driver manually drives the vehicle M. The front gaze point calculating unit 28 sets a front gaze point to a position in the front of the vehicle M which is separated more from the vehicle M as the vehicle speed of the vehicle M becomes higher.

The vehicle control unit 29 controls steering of the vehicle M based on the position of the vehicle M, the lane traveling distance of the vehicle M, the waypoint map, and the front gaze point. The vehicle control unit 29 controls the vehicle speed of the vehicle M based on the position of the vehicle M, the lane traveling distance of the vehicle M, the waypoint map, and the control target map.

Details of automatic driving of the vehicle M using the vehicle controller 1 are disclosed in a Japanese patent application of the applicant of the disclosure (Japanese Patent Application No 2015-100287).

(Road Marking Recognition)

A method of recognizing (detecting) a road marking as an example of a landmark target using the target detecting unit 22 as a specific example of the road marking recognition device according to the disclosure will be described below.

A road marking is used to correct a position of a vehicle M as described above. Since the current value of the vehicle M which is traveling varies moment by moment, it is necessary to relatively rapidly recognize a road marking. In addition, recognition accuracy to an extent that can be used to correct the position of the vehicle M is required. On the other hand, when performance required for the target detecting unit 22 that recognizes a road marking is relatively increased, for example, an increase in cost is caused.

Accordingly, processing related to recognition of a road marking has to be processing capable of satisfying the required recognition accuracy and capable of recognizing a road marking at a relatively high speed while minimizing a processing load (a computational load). Therefore, in recognition of a road marking according to this embodiment, a road marking is recognized with attention to local (partial) features of a road marking as a recognition target. Specifically, recognition of a road marking is performed by template matching using image patterns (that is, templates) indicating local features of a road marking that is a recognition target.

Sizes and shapes of road markings that are recognition targets are defined by laws. In addition, a direction in which the vehicle M passes a road marking is almost constant. That is, a change in the size or direction of a recognition target does not have to be considered in recognition of a road marking. Accordingly, the template matching can be said to be a recognition method which is suitable for recognizing a road marking.

Configuration for Recognition of Road Marking

Figure 2:
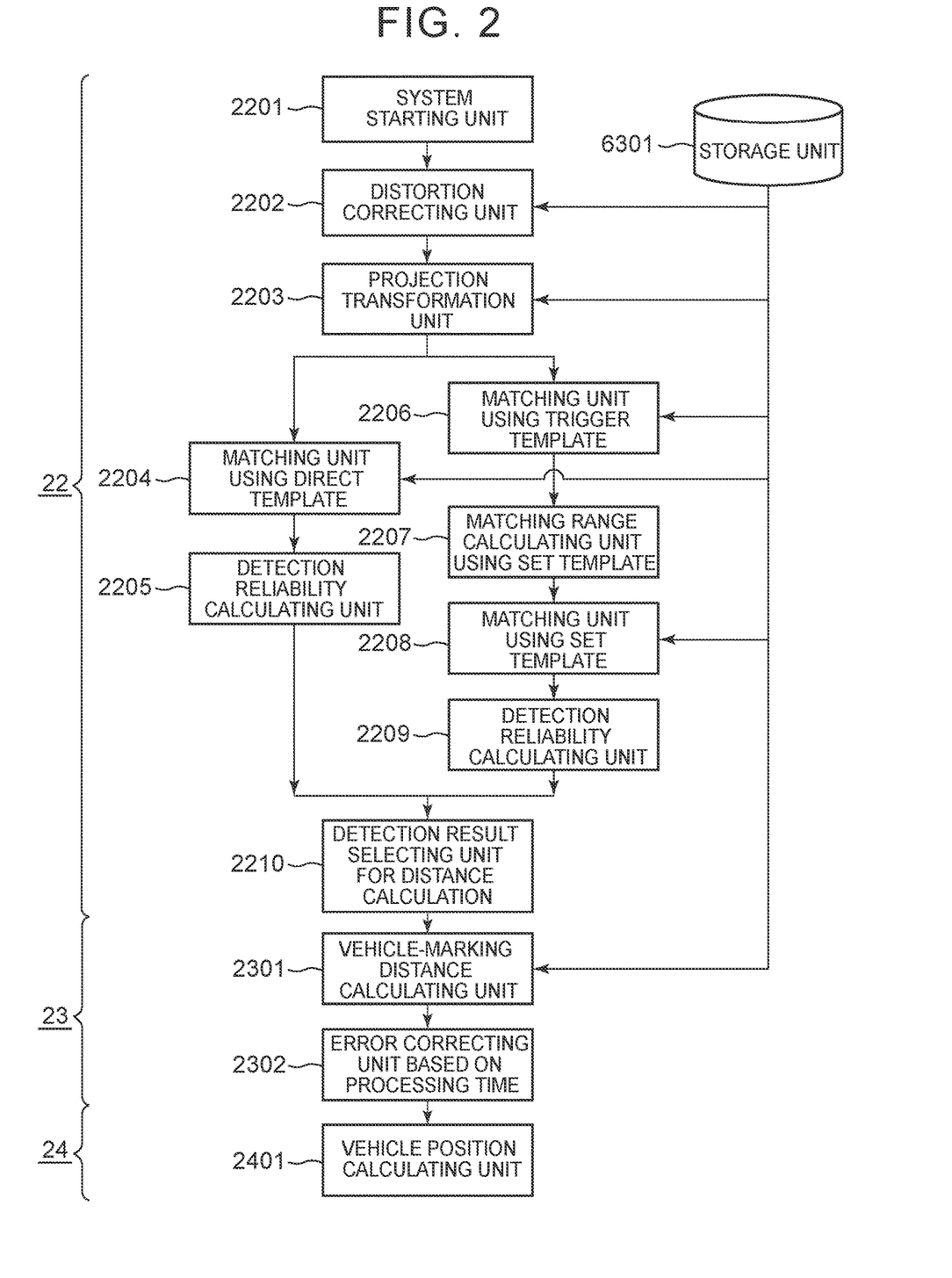
FIG. 2 is a block diagram illustrating a configuration for realizing road marking recognition according to the embodiment.

A configuration for recognizing a road marking (and correcting a position of a vehicle M) will be first described with reference to FIG. 2. FIG. 2 is a block diagram illustrating a configuration for realizing recognition of a road marking according to this embodiment. In FIG. 2, arrows indicate flows of information.

In FIG. 2, the target detecting unit 22 includes a system starting unit 2201, a distortion correcting unit 2202, a projection transformation unit 2203, matching units 2204, 2206, and 2208, detection reliability calculating units 2205 and 2209, a matching range calculating unit 2207, and a detection result selecting unit 2210 as a processing block which is logically realized or a processing circuit which is physically realized therein.

The target distance detecting unit 23 includes a vehicle-marking distance calculating unit 2301 and an error correcting unit 2302 as a processing block which is logically realized or a processing circuit which is physically realized therein. The position correcting unit 24 includes a vehicle position calculating unit 2401 as a processing block which is logically realized or a processing circuit which is physically realized therein.

The system starting unit 2201 of the target detecting unit 22 starts a detection system (in other words, a detection program) of a road marking, on the assumption that the vehicle M is within a predetermined range from a road marking that is a recognition target, based on the position information of the vehicle M corrected by the position correcting unit 24 and a road marking that is a landmark target included in the landmark map generated by the landmark map generating unit 272.

The distortion correcting unit 2202 corrects distortion of an image acquired from the imaging information of the camera 31 using an existing method, for example, based on a distortion correction coefficient stored in advance in a storage unit 6301 corresponding to the target storage unit 63. The projection transformation unit 2203 performs projection transformation on the image of which the distortion has been corrected by the distortion correcting unit 2202 based on a projection transformation parameter stored in advance in the storage unit 6301 and generates an image which is a bird's-eye view from directly above the road. The image generated by the projection transformation unit 2203 is hereinafter referred to as a "search target image."

After the detection system has been started by the system starting unit 2201, the distortion correcting unit 2202 and the projection transformation unit 2203 sequentially perform distortion correction and projection transformation on a plurality of images which are sequentially acquired from the imaging information of the camera 31. As a result, search target images are sequentially generated. The "distortion correction coefficient" and the "projection transformation parameter" can be acquired, for example, based on calibration results related to the camera 31.

Figure 3A:
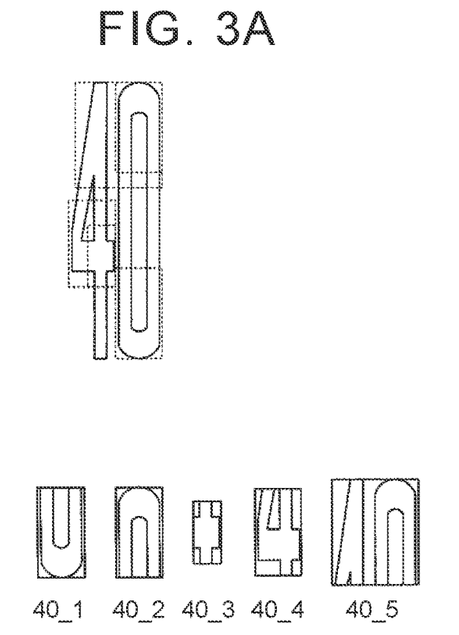
FIG. 3A is a diagram illustrating an example of a template according to the embodiment.
Figure 3B:
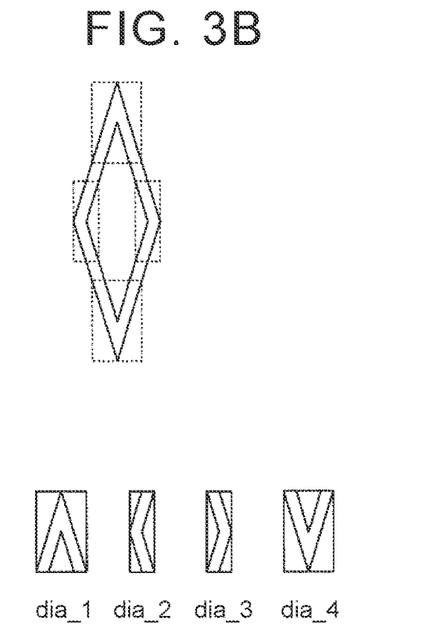
FIG. 3B is a diagram illustrating an example of a template according to the embodiment.

In the storage unit 6301, templates which are image patterns indicating local features of a road marking that is a recognition target are stored in advance as detection feature information of landmark targets. Templates according to this embodiment will be described with reference to FIGS. 3A and 3B. FIGS. 3A and 3B are diagrams illustrating examples of templates according to this embodiment. In FIGS. 3A and 3B, "speed limit 40 km/h" (FIG. 3A) and "presence of pedestrian crossing or bicycle crossing" (FIG. 3B) are illustrated as examples of road markings, but the disclosure is not limited thereto.

In the upper part of FIG. 3A, parts surrounded by dotted lines in the road marking (speed limit 40 km/h) are feature portions of the road marking. As a result, five images 40_1 to 40_5 illustrated in the lower part of FIG. 3A are set as the templates. Similarly, in the upper part of FIG. 3B, parts surrounded by dotted lines in the road marking (presence of pedestrian crossing or bicycle crossing) are feature portions of the road marking. As a result, four images dia_1 to dia_4 illustrated in the lower part of FIG. 3B are set as the templates.

It is preferable that a template be set to satisfy the following four conditions, that is, (i) a condition that each template not be a simple portion such as a straight portion, but a portion having a geometrical feature, (ii) a condition that a plurality of templates of one road marking be distributed uniformly over the whole road marking, (iii) a condition that each template include a portion of which the number of opportunities for passage of tires is considered to be small to minimize an influence of deterioration of the road marking due to abrasion, and (iv) a condition that each template include a portion in which paints overlap at the time of laying the road marking.

In this embodiment, each of a plurality of templates for one road marking has at least one function of the following three types of functions, that is, (i) a direct template, (ii) a trigger template, and (iii) a set template.

A direct template refers to a template in which one road marking can be specified with only a feature portion included in an image set as the template. A trigger template and set templates are templates of which a relative positional relationship between the templates is known. The trigger template refers to a template in which detection of set templates is started by detecting the template. The trigger template is typically a template (for example, the image 40_1 and the image dia_4) including a feature portion on the side which a vehicle traveling forward approaches in a road marking. The set templates refer to templates which are detected using a relative positional relationship between the templates. The set templates are templates (for example, the images 40_2 to 40_5 and the images dia_1 to dia_3) including feature portions located on the front side of the feature portion corresponding to the trigger template in the traveling direction of a vehicle in a road marking. Images which are used as the trigger templates or the set templates may be used as the direct template.

Referring to FIG. 2 again, the matching unit 2204 acquires a direct template corresponding to a road marking as a recognition target from the storage unit 6301 and performs matching using the acquired direct template.

The landmark map generated by the landmark map generating unit 272 is a data array related to a landmark target (here, a road marking) as described above. That is, the matching unit 2204 acquires data (for example, types) related to road markings to be recognized in advance. Accordingly, for example, when a road marking to be recognized is "speed limit 40 km/h," the matching unit 2204 acquires only a direct template related to "speed limit 40 km/h" from the storage unit 6301. (The same is true of the matching units 2206 and 2208 which will be described later.) The template matching may be performed, for example, using an existing method such as a correlation calculating method of calculating a degree of correlation between a template and a search target image based on luminance or a matching method based on an edge feature amount. A plurality of threshold values which are used to determine whether matching succeeds in the template matching are preferably prepared to correspond to a plurality of situations such as weather or time zones.

The detection reliability calculating unit 2205 calculates a degree of reliability of the matching result when matching succeeds using a direct template. The "degree of reliability" may be, for example, "degree of reliability=degree of correlation/predetermined threshold value" when the correlation calculating method is used for the template matching.

The matching unit 2206 acquires a trigger template corresponding to a road marking as a recognition target from the storage unit 6301 and performs matching using the acquired trigger template.

When matching by the matching unit 2206 succeeds, the matching range calculating unit 2207 sets a range in which set templates are searched for based on the relative positional relationship between the trigger template and the set templates corresponding to the road marking as a recognition target.

The matching unit 2208 acquires set templates corresponding to the road marking as a recognition target from the storage unit 6301 and performs matching using the acquired set templates in the range set by the matching range calculating unit 2207.

When matching using the set templates succeeds, the detection reliability calculating unit 2209 calculates a degree of reliability of the matching result.

Figure 4A:
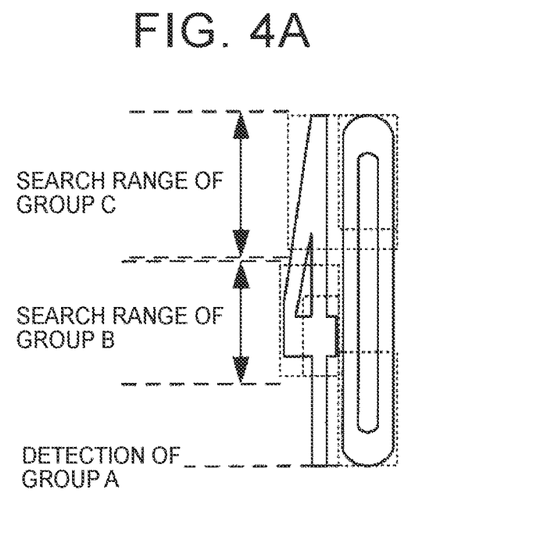
FIG. 4A is a conceptual diagram illustrating a matching method using a set template according to the embodiment.
Figure 4B:
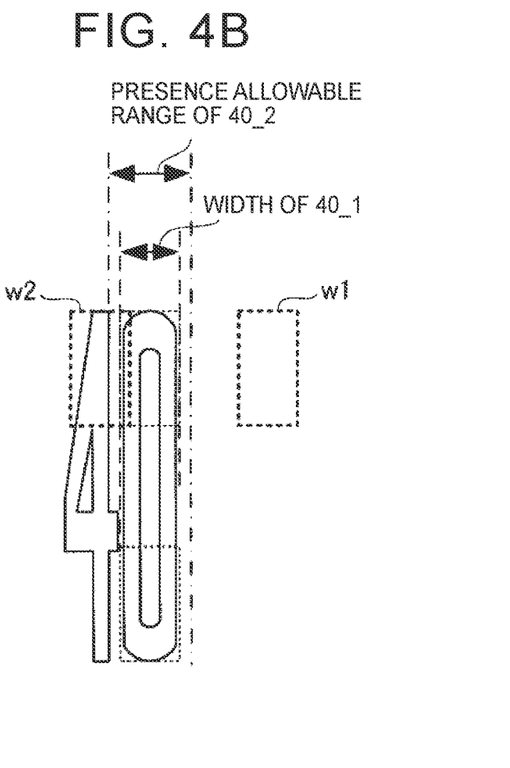
FIG. 4B is a conceptual diagram illustrating a matching method using a set template according to the embodiment.

Matching using set templates will be described below with reference to FIGS. 4A and 4B. FIGS. 4A and 4B are conceptual diagrams illustrating a matching method using set templates according to this embodiment. In FIGS. 4A and 4B, it is assumed that the vehicle M travels upward from the bottom in the drawings.

It is assumed that the image 40_1 in FIG. 3A is a trigger template and the images 40_2 to 40_5 in FIG. 3A are set templates. In FIG. 4A, the image 40_1 is classified as "Group A," the images 40_3 and 40_4 are classified as "Group B," and the images 40_2 and 40_5 are classified as "Group C."

In FIG. 4A, when a feature portion corresponding to the image 40_1 as a trigger template is detected from one search target image by the matching unit 2206, the matching range calculating unit 2207 determines a search range of Group B in the traveling direction of the vehicle M (that is, a direction from the bottom to the top in FIG. 4A) based on the relative positional relationship between the image 40_1 as a trigger template and the set templates (that is, the images 40_3 and 40_4) included in Group B and determines a search range of Group C in the traveling direction of the vehicle M based on the relative positional relationship between the image 40_1 as a trigger template and the set templates (that is, the images 40_2 and 40_5) included in Group C.

The matching unit 2208 performs matching on a search target image (which should not be the same as the above-mentioned search target image) including the portion corresponding to the search range of Group B among the road marking using the images 40_3 and 40_4 as the set templates in the search range of Group B. The matching unit 2208 performs matching on a search target image (which should not be the same as the above-mentioned search target image) including the portion corresponding to the search range of Group C among the road marking using the images 40_2 and 40_5 as the set templates in the search range of Group C.

For example, when a feature portion corresponding to the image 40_2 is detected from the search target image, the matching unit 2208 determines whether the position of the detected feature portion in the width direction of the vehicle M (that is, in the right-left direction in FIGS. 4A and 4B) is suitable based on the relative positional relationship between the image 40_1 that is the trigger template and the image 40_2 that is the set template. Specifically, the matching unit 2208 determines whether the detected feature portion is present in a "presence allowable range of 40_2" in FIG. 4B.

Only when the detected feature portion is present in the "presence allowable range of 40_2," does matching using the image 40_2 as the set template actually succeed. Even when the detected feature portion is present in a range surrounded by the dotted line w1 or w2 in FIG. 4B, the feature portion does not satisfy the relative positional relationship between the image 40_1 as the trigger template and the image 40_2 that is the set template and thus the detected feature portion can be said to be based on appearance matching.

In this embodiment, when a feature portion corresponding to at least one of the images 40_2 to 40_5 that are the set templates is detected, it is determined that matching using the set template succeeds.

Referring to FIG. 2 again, the detection result selecting unit 2210 compares the degrees of reliability calculated by the detection reliability calculating units 2205 and 2209 and selects the matching result having the highest degree of reliability.

The vehicle-marking distance calculating unit 2301 of the target distance detecting unit 23 calculates a distance between the center of gravity of the vehicle M and the center of the road marking by coordinate transformation using a parameter for coordinate transformation stored in advance in the storage unit 6301 based on the matching result selected by the detection result selecting unit 2210.

The error correcting unit 2302 calculates a distance that the vehicle M travels in a period in which processing associated with the road marking recognition or the like is performed based on a time at which an image that is a matching target (that is, an original image of a search target image) is captured, a current time, and vehicle speed information acquired from the internal sensor 4, and corrects the distance calculated by the vehicle-marking distance calculating unit 2301. For example, the traveling distance of the vehicle M when the vehicle M travels at a speed of 36 km/h and the road marking recognition takes 0.1 seconds is 1 m. By causing the error correcting unit 2302 to consider the traveling distance, automatic driving of the vehicle M using the vehicle controller 1 is appropriately performed.

The vehicle position calculating unit 2401 of the position correcting unit 24 calculates the center of gravity of the vehicle M on a map based on the distance between the center of gravity of the vehicle M and the center of the road marking corrected by the error correcting unit 2302 and the position of the landmark target (the road marking herein) on the map information. The calculated center of gravity of the vehicle M corresponds to the position information of the vehicle M corrected by the position correcting unit 24.

Road Marking Recognizing Process

A road marking recognizing process will be described below with reference to the flowcharts illustrated in FIGS. 5 to 8.

Figure 5:
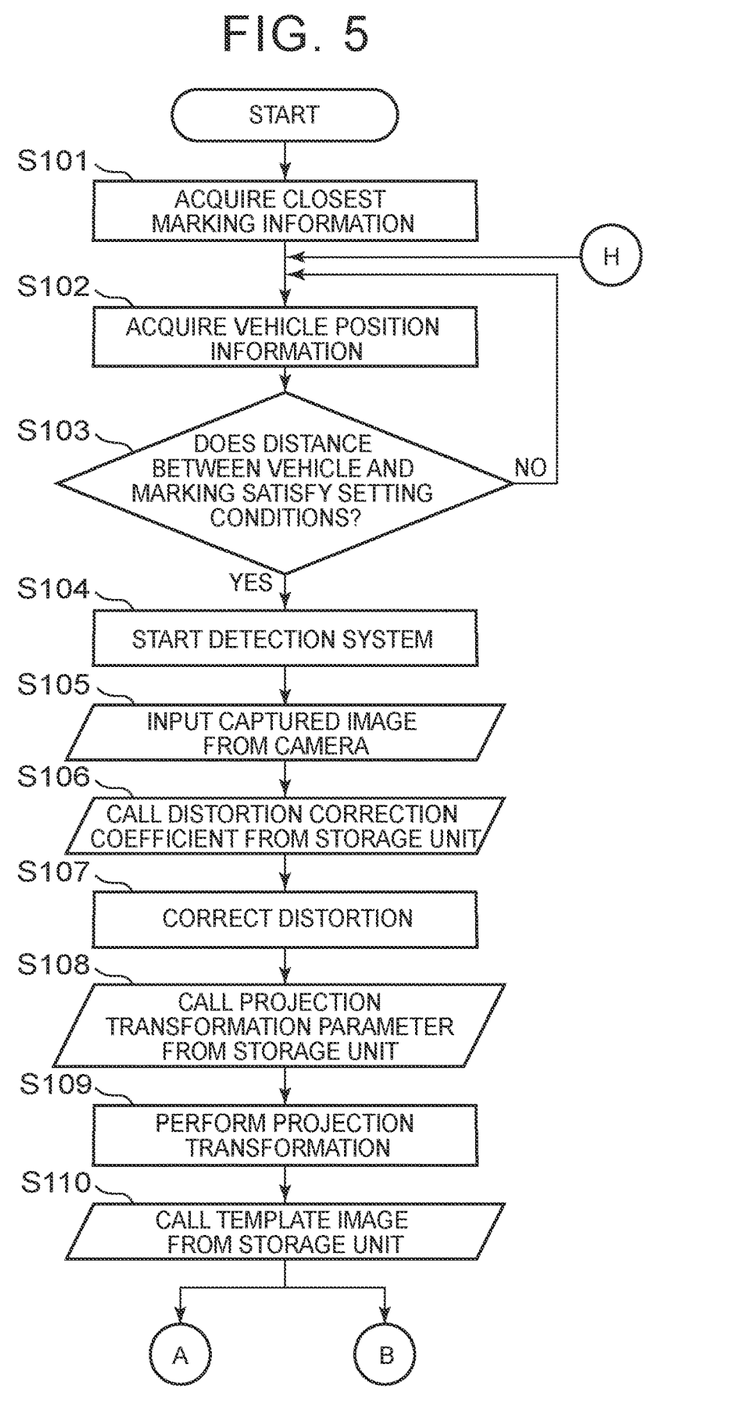
FIG. 5 is a flowchart illustrating a part of a road marking recognizing process according to the embodiment.

In FIG. 5, the system starting unit 2201 of the target detecting unit 22 acquires information (for example, a position and a type) related to a road marking closest to the current position of the vehicle M among road markings that are landmark targets included in the landmark map generated by the landmark map generating unit 272 (Step S101). In parallel with the process of Step S101, the system starting unit 2201 acquires the position information of the vehicle M (that is, the position information of the vehicle M calculated in the previous process) corrected by the position correcting unit 24 (Step S102).

Then, the system starting unit 2201 determines whether the distance between the vehicle M and the road marking to be recognized satisfies setting conditions (that is, whether the vehicle M is present within a predetermined range from the road marking to be recognized) based on the information related to the road marking to be recognized and the position information of the vehicle M (Step S103). When it is determined that the setting conditions are not satisfied (NO in Step S103), the process of Step S102 is performed again.

On the other hand, when it is determined in Step S103 that the setting conditions are satisfied (YES in Step S103), the system starting unit 2201 starts the detection system of a road marking (Step S104).

Then, the distortion correcting unit 2202 acquires a captured image from the imaging information of the camera 31 (Step S105). Subsequently, the distortion correcting unit 2202 calls a distortion correction coefficient stored in advance in the storage unit 6301 (Step S106) and corrects distortion of the captured image (Step S107).

Then, the projection transformation unit 2203 calls a projection transformation parameter from the storage unit 6301 (Step S108), performs projection transformation on the image of which the distortion has been corrected by the distortion correcting unit 2202, and generates a search target image (Step S109). As described above in the "configuration for recognizing road marking," the search target images are sequentially generated. That is, after the detection system has been started, the processes of Steps S105 to S109 are repeatedly performed regardless of the processing situations of the steps S110 and subsequent thereto.

Then, the matching unit 2204 calls a direct template corresponding to the road marking to be recognized from the storage unit 6301. The matching unit 2206 calls a trigger template corresponding to the road marking to be recognized from the storage unit 6301 (Step S110).

Figure 6:
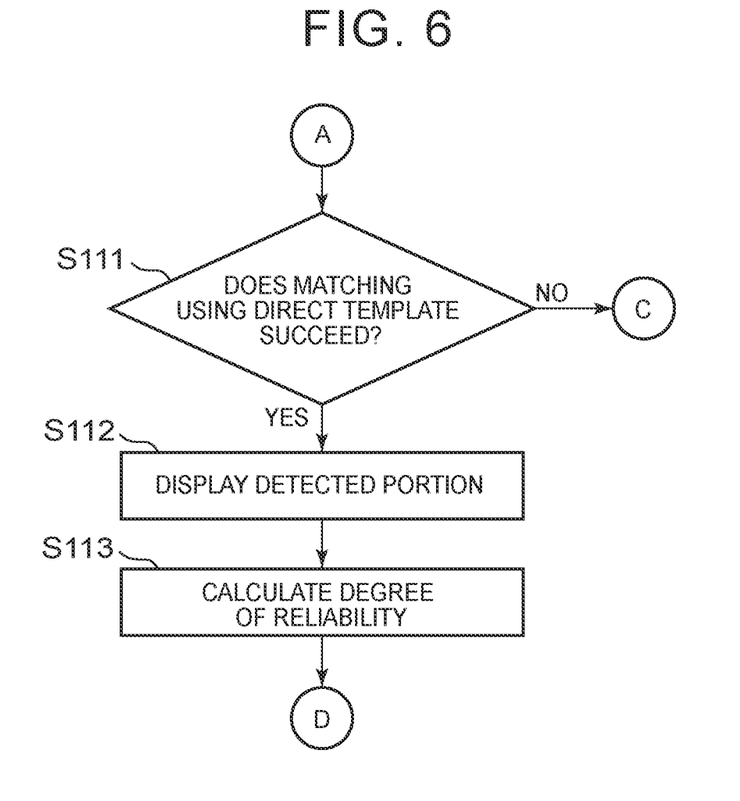
FIG. 6 is a flowchart illustrating a part of a routine subsequent to the flowchart illustrated in FIG. 5.

In FIG. 6, the matching unit 2204 determines whether matching using the direct template has succeeded (Step S111). When it is determined that the matching has not succeeded (NO in Step S111), the process of Step S126 (see FIG. 8) which will be described later is performed.

On the other hand, when it is determined in Step S111 that the matching has succeeded (YES in Step S111), the matching unit 2204 presents a portion detected as a feature portion corresponding to the direct template in the search target image to the detection reliability calculating unit 2205 (Step S112).

Then, the detection reliability calculating unit 2205 calculates a degree of reliability of the matching result by the matching unit 2204 (Step S113). Thereafter, the process of Step S126 (see FIG. 8) which will be described later is performed.

Figure 7:
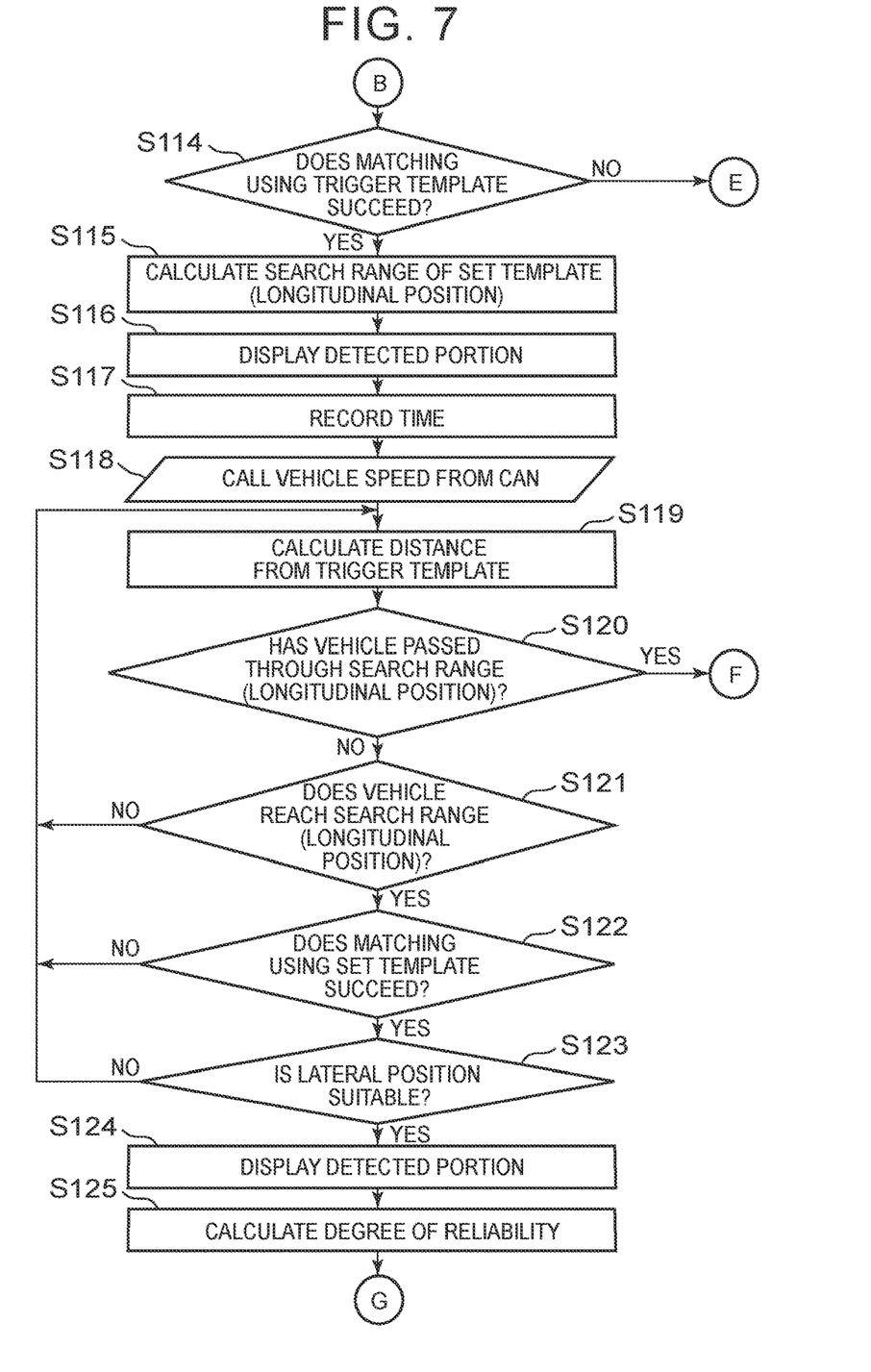
FIG. 7 is a flowchart illustrating another part of a routine subsequent to the flowchart illustrated in FIG. 5.

In FIG. 7, the matching unit 2206 determines whether matching using the trigger template has succeeded (Step S114). When it is determined that the matching has not succeeded (NO in Step S114), the process of Step S126 (see FIG. 8) which will be described later is performed. The search target image which is used for matching using the trigger template cannot be said to be the same as the search target image which is used for matching using the direct template.

When it is determined in Step S114 that the matching has succeeded (YES in Step S114), the matching range calculating unit 2207 sets a search range in a longitudinal direction (that is, the traveling direction of the vehicle M) in which set templates are searched for based on the relative positional relationship between the trigger template and the set templates (Step S115).

In parallel with the process of Step S115, the matching unit 2206 presents a portion detected as a feature portion corresponding to the trigger template in the search target image to the matching unit 2208 (Step S116). The matching unit 2208 records the time at which the feature portion corresponding to the trigger template is detected (Step S117) and calls the vehicle speed information of the internal sensor 4 via a controller area network (CAN) (Step S118).

The matching unit 2208 calculates a distance after the vehicle M passes through a point at which the feature portion corresponding to the trigger template in the road marking to be recognized is laid based on an elapsed time from the time recorded in the process of Step S117 and the vehicle speed information (Step S119).

Then, the matching unit 2208 determines whether the vehicle M has passed through the search range set in the process of Step S115 based on the distance calculated in the process of Step S119 (Step S120). That is, it is determined whether the vehicle M has not passed through a point at which the camera 31 can image the feature portion corresponding to the search range set in the process of Step S115 in the road marking to be recognized. When it is determined that the vehicle has passed through the search range (YES in Step S120), the process of Step S126 (see FIG. 8) which will be described later is performed.

On the other hand, when it is determined in step S120 that the vehicle M has not passed through the search range (NO in Step S120), the matching unit 2208 determines whether the vehicle M has reached the search range based on the distance calculated in the process of Step S119 (Step S121). That is, it is determined whether the vehicle M has reached the point at which the camera 31 can image the feature portion corresponding to the search range set in the process of Step S115 in the road marking to be recognized. When it is determined that the vehicle M has not reached the search range (NO in Step S121), the process of Step S119 is performed again.

On the other hand, when it is determined in Step S121 that the vehicle M has reached the search range (YES in Step S121), the matching unit 2208 determines whether matching using the set templates has succeeded (Step S122). When it is determined that the matching has not succeeded (NO in Step S122), the process of Step S119 is performed again. The search target image which is used for matching using the set templates cannot be said to be the same as the search target image which is used for matching using the direct template and/or the trigger template.

On the other hand, when it is determined in Step S122 that the matching has succeeded (YES in Step S122), the matching unit 2208 determines whether a lateral position (that is, a position in the width direction of the vehicle M) of the feature portion corresponding to the set templates of which the matching has succeeded is suitable as a feature portion corresponding to the set template (Step S123). When it is determined that the lateral position is not suitable (NO in Step S123), there is a high likelihood of erroneous detection and thus the process of Step S119 is performed again.

On the other hand, when it is determined in Step S123 that the lateral position is suitable (YES in Step S123), the matching unit 2208 presents the portion detected as the feature portion corresponding to the set template in the search target image to the detection reliability calculating unit 2209 (Step S124). Then, the detection reliability calculating unit 2209 calculates a degree of reliability of the matching result by the matching unit 2208 (Step S125).

Figure 8:
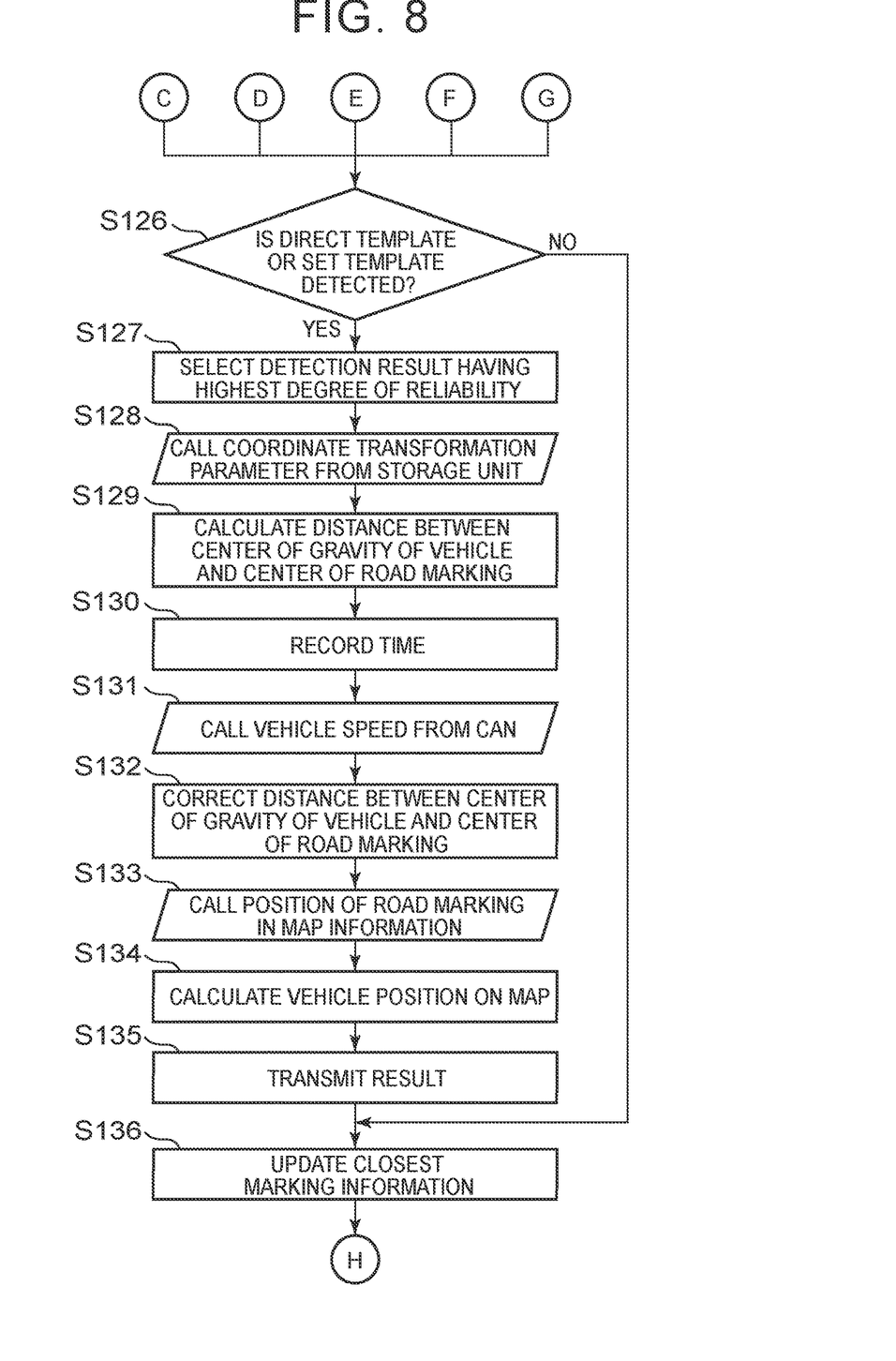
FIG. 8 is a flowchart illustrating a part of a routine subsequent to the flowcharts illustrated in FIGS. 6 and 7.

In FIG. 8, the detection result selecting unit 2210 determines whether a feature portion corresponding to the direct template or the set template has been detected (Step S126). When it is determined that a feature portion corresponding to the direct template and a feature portion corresponding to the set template have not been detected (NO in Step S126), the process of Step S136 which will be described later is performed.

On the other hand, when it is determined in Step S126 that a feature portion corresponding to the direct template or the set template has been detected (YES in Step S126), the detection result selecting unit 2210 compares the degrees of reliability calculated by the detection reliability calculating units 2205 and 2209 and selects the matching result having the highest degree of reliability (Step S127). When only a feature portion corresponding to the direct template or only a feature portion corresponding to the set template has been detected, the matching result related to the detected feature portion is automatically selected.

Then, the vehicle-marking distance calculating unit 2301 of the target distance detecting unit 23 calls a parameter for coordinate transformation from the storage unit 6301 (Step S128). Subsequently, the vehicle-marking distance calculating unit 2301 calculates a distance between the center of gravity of the vehicle M and the center of the road marking from the matching result selected by the detection result selecting unit 2210 using the parameter for coordinate transformation (Step S129).

Then, the error correcting unit 2302 records the time (the current time) at which the distance between the center of gravity of the vehicle M and the center of the road marking is calculated (Step S130) and calls the vehicle speed information of the internal sensor 4 via the CAN (Step S131).

Then, the error correcting unit 2302 calculates a distance by which the vehicle M travels in a period in which the processing related to the road marking recognition or the like is performed based on the time at which an image to be matched (that is, an original image of the search target image) is captured, the current time, and the vehicle speed information acquired from the internal sensor 4, and corrects the distance calculated by the vehicle-marking distance calculating unit 2301 (Step S132).

Then, the vehicle position calculating unit 2401 of the position correcting unit 24 calls the position of the road marking as a landmark target on the map information (Step S133). Subsequently, the vehicle position calculating unit 2401 calculates the center of gravity of the vehicle M on the map based on the position of the road marking and the distance between the center of gravity of the vehicle M and the center of the road marking corrected by the error correcting unit 2302 (Step S134), and outputs the calculation result to the position correcting unit 24 (Step S135).

Thereafter, the system starting unit 2201 of the target detecting unit 22 acquires information related to a new road marking closest to the current position of the vehicle M among the road markings as a landmark target included in the landmark map generated by the landmark map generating unit 272 (Step S136). Thereafter, the processes of Step S102 and the steps subsequent thereto are performed.

(Technical Advantages)

In the road marking recognition according to this embodiment, the recognition of a road marking is performed with attention to a partial feature portion of the road marking (that is, using the direct template, the trigger template, and the set templates). Accordingly, for example, when there is disturbance such as when a part of a road marking is worn, when a shadow of a building or the like is suspended over a part of a road marking, or when a part of a road marking is covered with another vehicle, it is possible to recognize a road marking as a recognition target.

In the road marking recognition, since a road marking is recognized with attention to a partial feature portion of the road marking, it is possible to reduce a processing load in comparison with a case in which the whole road marking is recognized at a time. Since a search target image which is used for template matching may not be an image including the whole road marking, it is possible to recognize a road marking, for example, without accumulating a plurality of images acquired by imaging a road surface. In the road marking recognition, since a search target image is generated or matching is performed only when the vehicle M reaches the vicinity of a road marking to be recognized, it is possible to reduce a processing load in comparison with a case in which generation of a search target image or the like is always performed.

In the road marking recognition, particularly, template matching using a trigger template or set templates in which a relative positional relationship is used is performed. That is, in the road marking recognition, since a road marking is recognized from two points of view of a feature portion and a relative positional relationship, it is possible to improve recognition accuracy of a road marking.

The "matching unit 2208" and the "storage unit 6301" in the embodiment may be regarded as examples of the "recognition unit" and the "storage" in the claims. The "trigger template" and the "set template" in the embodiment may be regarded as examples of the "first template" and the "second template" in the claims.

The disclosure is not limited to the above-mentioned embodiment and can be appropriately modified without departing from the gist or spirit of the disclosure which can be read from the appended claims and the whole specification, and road marking recognition devices including such modifications are also included in the technical scope of the disclosure.

What is claimed is:

1. A road marking recognition device that recognizes a road marking from an image acquired by imaging a road surface of a road on which a vehicle is traveling, the road marking recognition device comprising:
    a storage unit that includes a database and processing circuitry, the storage unit configured to store at least one direct template and a plurality of second templates, each of the at least one direct template and each of the plurality of the second templates corresponds to a corresponding one of a plurality of feature portions of a target road marking and the plurality of second templates being such that a relative positional relationship is known, the target road marking being a road marking which is a recognition target; and
    an electronic control unit configured to detect a second feature portion corresponding to a second template among the plurality of second templates when a first feature portion corresponding to a first trigger template among the plurality of second templates is detected from the image, the second template among the plurality of second templates being located on a front side of the first feature portion in a traveling direction of the vehicle based on at least one of a yaw rate information of an internal sensor, a speed rate information of another internal sensor, and a temporal change of a position information of the vehicle, and configured to determine that the target road marking is recognized when a third feature portion corresponding to the at least one direct template is detected from the image,
    wherein the electronic control unit is configured to start detection of the first feature portion based on the position information of the vehicle and map information which includes information related to position of the road marking.

2. The road marking recognition device according to claim 1, wherein the electronic control unit is configured to determine that the target road marking is recognized when the second feature portion is detected.

3. A road marking recognition device mounted in a vehicle including a camera configured to acquire an image by imaging a road surface of a road on which the vehicle is traveling, the road marking recognition device comprising:
    a storage unit that includes a database and processing circuitry, the storage unit configured to store at least one direct template, a plurality of second templates, and a relative positional relationship between the plurality of second templates, each of the at least one direct template and the plurality of second templates corresponds to a corresponding one of a plurality of feature portions of a target road marking, the target road marking being a road marking which is a recognition target; and
    at least one electronic control unit configured to:
        detect a first feature portion corresponding to a first trigger template among the plurality of second templates from a first image captured by the camera,
        detect a second feature portion corresponding to a second template among the plurality of second templates when the first feature portion is detected from the image, the second template among the plurality of second templates being located on a front side of the first feature portion in a traveling direction of the vehicle based on at least one of a yaw rate information of an internal sensor, a speed rate information of another internal sensor, and a temporal change of a position information of the vehicle, and
        determine that the target road marking is recognized when a third feature portion corresponding to the at least one direct template is detected from the image,
    wherein the at least one electronic control unit is configured to start detection of the first feature portion based on the position information of the vehicle and map information which includes information related to position of the road marking.

4. The road marking recognition device according to claim 3, wherein the at least one electronic control unit is configured to determine that the target road marking is recognized when the second feature portion is detected.

5. The road marking recognition device according to claim 3, wherein
the at least one electronic control unit is configured to:
detect a candidate portion which is a candidate for the second feature portion, the candidate portion being a portion having a feature matching the second template among the plurality of second templates; and
determine that the candidate portion is the second feature portion when a position of the candidate portion is located in an allowable range which is set using a relative position between the first trigger template and the second template among the plurality of second templates.

6. The road marking recognition device according to claim 3, wherein
the at least one electronic control unit is configured to detect the second feature portion from a second image captured after the first image is captured.

7. The road marking recognition device according to claim 3, wherein
the second template among the plurality of second templates is set to correspond to a portion located on a front side of the first feature portion in the traveling direction of the vehicle.

* * * * *